(No Model.)

J. A. SNEED.
TWO WHEELED VEHICLE.

No. 387,322. Patented Aug. 7, 1888.

Witnesses,
Geo. H. Strong.
J. T. Rouse.

Inventor,
J. A. Sneed
By Dewey & Co.
attys.

UNITED STATES PATENT OFFICE.

JAMES A. SNEED, OF MARYSVILLE, CALIFORNIA.

TWO-WHEELED VEHICLE.

SPECIFICATION forming part of Letters Patent No. 387,322, dated August 7, 1888.

Application filed November 10, 1887. Serial No. 254,863. (No model.)

*To all whom it may concern:*

Be it known that I, JAMES A. SNEED, of Marysville, county of Yuba, and State of California, have invented an Improvement in Two-Wheeled Vehicles; and I hereby declare the following to be a full, clear, and exact description thereof.

My invention relates to the class of two-wheeled vehicles commonly known as "carts;" and my invention consists, essentially, in the novel, limited, and adjustable hinge or pivot connection by which the axle is let into the structure, whereby the body is allowed an independence of movement and the vibratory motion of the shafts is not communicated to the axle.

My invention consists, in particular, in the combination of a pivot or hinge connection of the parts of the vehicle—to wit, the body and shafts with the axle-limiting springs under the axle for controlling the pivot or hinge connection, and adjustable connections from said springs by which the control is regulated.

It further consists in the construction, arrangement, and combination of the axle, body, shafts, main springs, pivot-connections, limiting-springs, and adjusting devices, all as hereinafter more fully described.

The general object of my invention is to overcome the unpleasant motion which, in this class of vehicles, is due to the jogging of the horse.

Regarding the general structure of a cart as comprising three main elements—namely, the shafts, the wheeled axle, and the body—it is apparent that the connection between them cannot at any point be an unlimited hinge or pivot, for if the shafts were connected with the axle after the manner of four-wheeled vehicles the axle would turn, and, carrying the body with it, would precipitate the occupant. The same result would follow if the body were simply hinged on the axle. Consequently it will be found that in the old style of carts the connections are all rigid, so as to afford stability; but it is plain that while safety is thus obtained it is at the expense of comfort, for the jogging of the horse is transmitted through the shafts to oscillate the axle, which in turn vibrates the body and causes that unpleasant forward and back motion to the occupant which renders carts so unpopular. There is between these extremes a middle course, which unites stability with comfort, and this course involves three things—namely, the joining the body with the axle by a limited yielding connection, the connection of the shafts in a similar manner, and the employment in the same vehicle of both connections.

Figure 1:
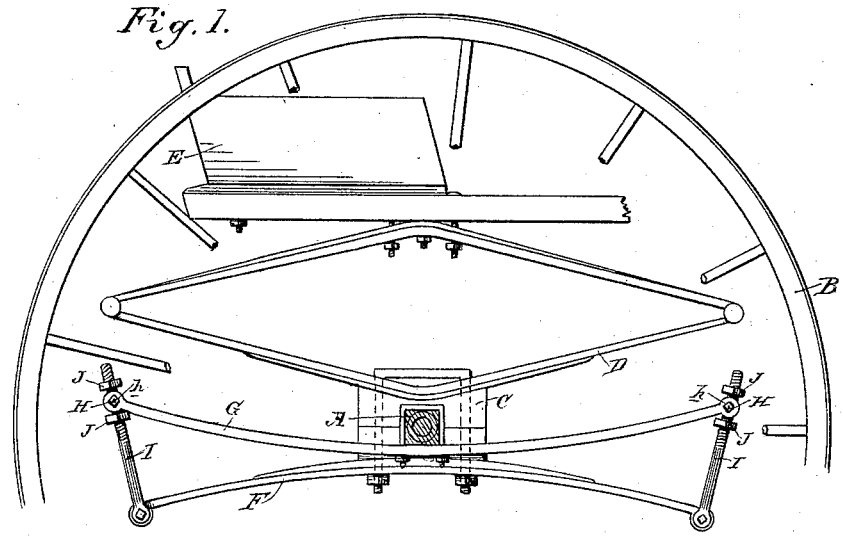
Figure 2:
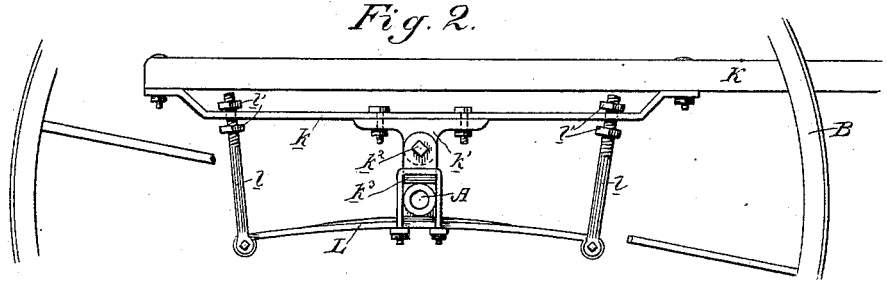
Figure 4:
Figure 3:
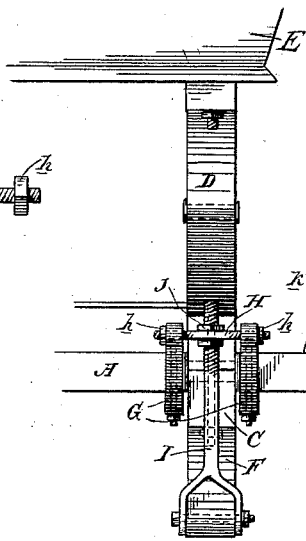

Referring to the accompanying drawings, Figure 1 is a side elevation of the body-connection. Fig. 2 is a side elevation of the shaft-connection. Fig. 3 is an end elevation of one end of the axle, showing the subject-matter of Figs. 1 and 2. Fig. 4 is a view of the cross-tie H.

A is the axle, and B is one wheel, of a cart. Upon the axle is loosely pivoted or journaled the box C, to the upper portion of which is clipped solidly or rigidly the main supporting-spring D, to which is clipped, in suitable manner, the body or seat E. To the lower portion of the pivoted box is clipped solidly and rigidly the limiting-spring F.

G is the jack, which is clipped solidly to the axle. In each end of the jack, which is forked for the purpose, is secured the cross-tie H, (shown in Fig. 4,) the ends of said tie being passed through the forks of the jack and held in place by nuts *h*. The tie has a hole in its center to receive the stirrup-bolts I, which are connected with the ends of the limiting-spring below and pass upwardly through the cross-ties.

J are nuts on the upper ends of the stirrup-bolts, by which they are adjusted and the connection between the limiting-spring and the jack suitably regulated.

It will be understood that near the other end of the axle there are the duplicates of the several parts described, but which need not herein be shown.

It will be seen by this construction that, as the boxes C are pivoted on the axle and said boxes carry the body-supporting springs D, said body would, in the absence of all other connections, have entire freedom of motion; but this freedom, unlimited, is not, as heretofore said, to be desired, and therefore a limit is set to it by the connection between the springs F below and the jacks G, so that the body finds through these a connection with the axle of the cart, said connection being, however, a springy or yielding one, adjustable by means of the nuts J on the stirrup-bolts I. The body may therefore have an easy vibratory movement, which enables the occupant to counteract the motion derived from the jogging of the horse, and thereby render the vehicle an easy and pleasant riding conveyance. To further this result I connect the shafts K as shown in Fig. 2 particularly.

The shaft K has bolted under its rear end the stirrup $k$, which at its center has a bearing, $k'$, which is coupled by a pivot-connection at $k^2$ to the bearing $k^3$, rising from the axle. Under the axle is clipped rigidly the limiting-spring L, the ends of which are provided with stirrup-bolts $l$, which pass upward through the stirrup $k$ of the shaft, and are provided with adjusting-nuts $l'$, as shown. There are, of course, duplicate connections for the other shaft.

It will thus be seen that while the connection of the shafts with the axle is a pivoted one, this connection is limited by the springs L, which at the same time provide adjustable limits to the connection, as well as springy ones. The motion, therefore, which the shafts receive from the jogging of the horse is not communicated to the axle of the vehicle, and therefore the body or seat of said vehicle is not subjected to the usual unpleasant motion. The connections—namely, of the body with the axle and of the shafts with the axle—are essentially similar, the only difference being that in one case the limiting-spring is fast to the axle and in the other case not, and though either may be used alone in a vehicle, I find it better to employ both, as I thereby obtain a double independence of motion.

Having thus described my invention, what I claim as new, and desire to secure by Letters Patent, is—

1. In a two-wheeled vehicle, a pivot or hinge joint between the axle and portion of the vehicle to be connected therewith, in combination with a limiting-spring under the axle, whereby the movement of the joint is controlled, and an adjustable connection with said spring, whereby it is regulated, substantially as described.

2. In a two-wheeled vehicle, a pivot or hinge joint between the axle and the portion of the vehicle to be secured thereto, in combination with the means for limiting and adjusting the joint, consisting of a spring passing under the axle, and bolts and nuts by which the ends of the spring are connected with parts above, substantially as described.

3. In a two-wheeled vehicle, the axle and the jacks G, rigidly secured thereto, in combination with the boxes carrying the body of the vehicle and pivoted on the axle, the limiting-spring secured to the boxes under the axle, and the stirrup-bolts connecting the ends of the springs with the ends of the jacks, and nuts for adjusting said bolts, substantially as described.

4. In a two-wheeled vehicle, the axle and the jacks G, rigidly secured thereto, in combination with boxes pivoted on the axle, the main springs clipped to the boxes, and the body or seat carried by the springs, the limiting-springs clipped under the boxes, and the adjustable bolts connecting the ends of the limiting-springs with the ends of the jacks, substantially as described.

5. In a two-wheeled vehicle, the axle, the shafts, and a pivot or hinge connection between them, in combination with the limiting-springs secured under the axle and adjustable bolts between each end of the springs and the shafts above, substantially as described.

6. In a two-wheeled vehicle, the axle, the shafts, the stirrups $k$ on the shafts, and a hinge-connection between said stirrups and the axle, in combination with the limiting-springs under the axle and adjustable bolts connecting the ends of said springs with the stirrups, substantially as described.

7. The combination, in a two-wheeled vehicle, of the adjustable and limited hinge-connection of the body and the shafts with the axle, consisting of the jacks secured to the axle, the pivoted boxes on the axle, the limiting-springs F, secured to the boxes, and the bolts I, connecting said springs and jacks, the stirrups under the shafts, the limiting-springs L under the axle, and bolts $l$, connecting said springs with the stirrups, all arranged and adapted to operate substantially as described.

In witness whereof I have hereunto set my hand.

JAMES A. SNEED.

Witnesses:
 CHAS. E. SWEZY,
 SAML. EWELL.